United States Patent [19]

Kassai

[11] Patent Number: 4,714,141
[45] Date of Patent: Dec. 22, 1987

[54] BABY CARRIAGE WHEEL STOPPING DEVICE

[75] Inventor: Kenzou Kassai, Osaka, Japan

[73] Assignee: Aprica Kassai Kabushikikaisha, Osaka, Japan

[21] Appl. No.: 905,783

[22] Filed: Sep. 9, 1986

[30] Foreign Application Priority Data

Sep. 24, 1985 [JP] Japan ............... 60-145837[U]

[51] Int. Cl.⁴ ............................................. B62B 9/08
[52] U.S. Cl. ..................................... 188/20; 188/29; 188/74
[58] Field of Search ................ 188/19, 20, 21, 22, 188/29, 74, 57

[56] References Cited

U.S. PATENT DOCUMENTS

| 494,910 | 4/1893 | Wells | 188/20 |
| 980,621 | 1/1911 | Finch | 188/29 |
| 1,136,851 | 4/1915 | Uanderhill | 188/29 X |
| 1,824,484 | 9/1931 | Jackson | 188/20 |
| 2,456,250 | 12/1948 | Boudreau | 188/20 X |
| 2,591,524 | 4/1952 | Douglas et al. | 188/20 |
| 2,864,465 | 12/1958 | Welsh et al. | 188/20 |

FOREIGN PATENT DOCUMENTS

| 104770 | 6/1983 | Japan . | |
| 154451 | 2/1984 | Japan . | |
| 561668 | 5/1944 | United Kingdom | 188/20 |

Primary Examiner—George E. A. Halvosa
Attorney, Agent, or Firm—W. G. Fasse; D. H. Kane, Jr.

[57] ABSTRACT

A wheel stopping device for a baby carriage has a a pair of base members secured to the rear legs for rotatably supporting the rear wheels. A lever support (5) is journalled at (6) to at least one base member. A brake operating lever (7) is journalled at (8) to the lever support and at (10) to a brake rod (11) extending between and connected to the pair of base members. Each end of the brake rod is connected to its base member and the brake rod is so bent as to when the brake operating lever is activated. When the operating portion of the lever is stepped on, the journal points (6, 8, 10) lie substantially in a line for providing a self-locking toggle type action pressing the brake rod strongly against the rear wheel rims to thereby inhibit the rotation of the rear wheel.

1 Claim, 2 Drawing Figures

BABY CARRIAGE WHEEL STOPPING DEVICE

FIELD OF THE INVENTION

This invention relates to a wheel stopping device for keeping the wheels of a baby carriage immovable.

DESCRIPTION OF THE PRIOR ART

To enhance the safety in the use of a baby carriage, the baby carriage is usually provided with a wheel stopping device. By the action of this wheel stopping device, the baby carriage is inhibited from moving, for example, down a slope under its own weight. This wheel stopping device, which has an a direct bearing on the safety of the baby carriage, is preferably arranged so that it is capable of maintaining the stopped state of both the right and left rear wheels at the same time.

As examples of such wheel stopping devices for baby carriages, mention may be made of Japanese utility Model Application No. 3204/1982 (Japanese Utility Model Laying-Open No. 104770/1983) and Japanese Utility Model Application No. 49415/1983 (Japanese Utility Model Laying-Open No. 154451/1984). According to these prior publications, the stopped state of the wheels of the baby carriage is maintained by a projection laterally entering a recess between adjacent ribs on the wheel and engaging the same.

However, the brakes described in those references have the following problem.

As compared with the recess between adjacent ribs on the wheel, the projection which engages it, is small in size, so that there is a play between the recess and the projection. As a result, even if the projection is actuated to stop the wheel, the latter still moves by an amount corresponding to the play, so that the wheel cannot be stopped instantaneously. Further, when the projection is actuated to stop the wheel, the front end of the projection sometimes abuts against the top of a rib. In this case, the projection does not engage a recess, so that the wheel still moves.

For a better safety for the baby carriage, it is desirable that the wheel can be stopped as soon as the wheel stopping device is actuated.

SUMMARY OF THE INVENTION

A wheel stopping device for a baby carriage according to this invention comprises a pair of base members fixedly installed on the lower ends of the pair of rear legs of a baby carriage, a lever support member, a lever and a brake rod. The pair of base members rotatably support the pair of rear wheels. The lever support member is turnably connected at one end thereof to at least one base member by a first pin. The lever is turnably connected at substantially the middle thereof to said lever support member by a second pin, and one end of said lever which extends rearwardly, forms an operating portion to be operated by foot, while the other end which extends forwardly is formed with a through-hole. The brake rod extends between said pair of base members. One end of the brake rod extends through one base member, is bent to extend outwardly along a lateral surface of one rear wheel, is bent again to extend through the through-hole of the lever and is positioned above the outer peripheral surface of said one rear wheel. The other end of the brake rod extends through the other base member, is bent to extend outwardly along a lateral surface of the other rear wheel, is bent again and is positioned above the outer peripheral surface of said other rear wheel.

The base members, lever support member, lever, and brake member are shaped and relatively positioned to satisfy the following conditions:

a. During normal traveling of the baby carriage, there is a clearance between the brake rod and the outer peripheral surfaces of the rear wheels.

b. When the operating portion of the lever is stepped on, the second pin, the first pin and the through-hole lie substantially in a line with the first pin disposed in the middle, pressing the brake rod strongly against the outer peripheral surface of the rear wheel to thereby inhibit the rotation of said rear wheel.

As described above, according to this invention, when the lever is operated by foot, the brake rod positioned above the outer peripheral surfaces of the pair of rear wheels is pressed strongly against the outer peripheral surfaces of said pair of rear wheels to thereby inhibit the rotation thereof; thus, the rotation of the wheels is instantaneously stopped. In this manner, according to the invention, a wheel stopping device with an improved safety feature is obtained.

These objects and other objects, features, aspects and advantages of the present invention will become more apparent from the following detailed description of the present invention when taken in conjunction with the accompanying drawings.

DESCRIPTION OF A PREFERRED EXAMPLE EMBODIMENT AND OF THE BEST MODE OF THE INVENTION

Figure 1:
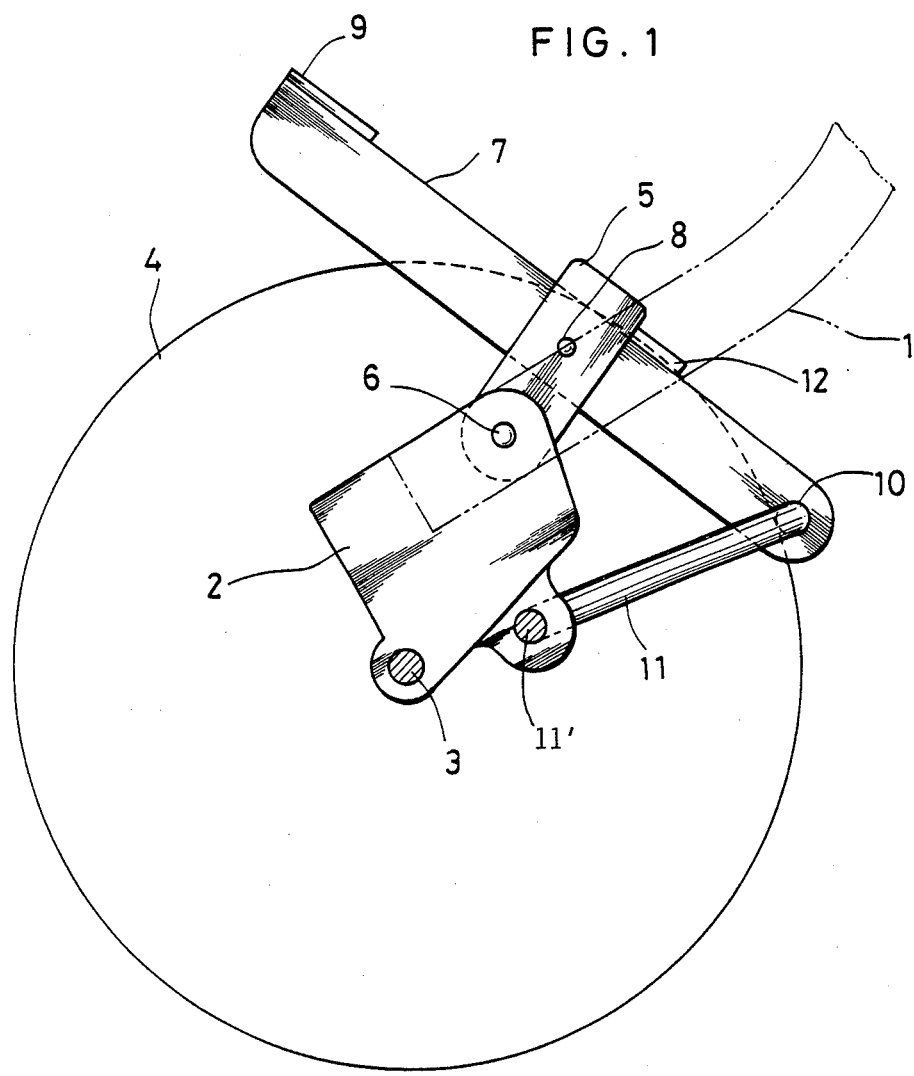
FIG. 1 is a side view showing the principal portion of and embodiment of the invention.

FIG. 1 shows the principal portion of an embodiment of the invention associated with the left-hand side rear wheel of a baby carriage.

The lower end of a rear leg 1 of the baby carriage shown in phantom lines has a base member 2 fixed thereon. A similar base member (not shown) is fixed on the right-hand side rear leg. An axle 3 extends through the pair of base members 2, and a pair of rear wheels 4 are rotatably supported on said axle 3.

A lever support member 5 is turnably connected to the base member 2, which is positioned on the left-hand side, by a first journal pin 6. Further, a lever 7 is turnably connected substantially at the middle thereof to said lever support member 5 by a second journal pin 8. One end of the lever 7 extends rearward to form an operating portion 9 operable by foot. The other end of the lever 7 extends forward and is formed with a through-hole 10.

A brake rod 11 is disposed to extend between the left-hand side base member 2 and the unillustrated right-hand side base member. One end of the brake rod 11 is journalled at 11' to one base member 2 to form a third journal. Said one end is bent to extend radially outwardly in the released position of FIG. 1 and along a lateral surface of the rear wheel 4, is bent again for journalling in the through-hole 10 of the lever 7 to form a fourth journal in the through-hole 10 and is positioned above the outer peripheral surface of the rear wheel 4 in the position shown in FIG. 1, wherein the stopping device is released so that the brake rod 11 does not press onto the peripheral surface of the wheel 4. The other end of the brake rod 11, though not shown, is bent outwardly to extend radially along a lateral surface of the other rear wheel and is bent again to be positioned above the outer peripheral surface of the other rear wheel in the released position of the lever 7 shown in FIG. 1.

In a preferred embodiment, as shown in FIG. 1, the lever 7 is preferably provided with a stopper 12 abutting against the lever support member 5, thereby inhibiting the lever support member 5 from further turning clockwise from the position shown in FIG. 1.

The base members 2, lever support member 5, lever 7, and brake rod 11 which are described above are shaped and relatively positioned to attain the operation to be described below.

The state shown in FIG. 1 is the normal traveling state of the baby carriage. In other words, in the state shown in FIG. 1, there is a clearance between the brake rod 11 and the outer peripheral surface of the rear wheel 4 and hence there is no friction produced therebetween, allowing the rear wheel 4 to rotate freely. In the released state of FIG. 1 the first and second journal pins 6, 8 and the axle 3 are located approximately on a common radial line through the center of said axle 3.

Figure 2:
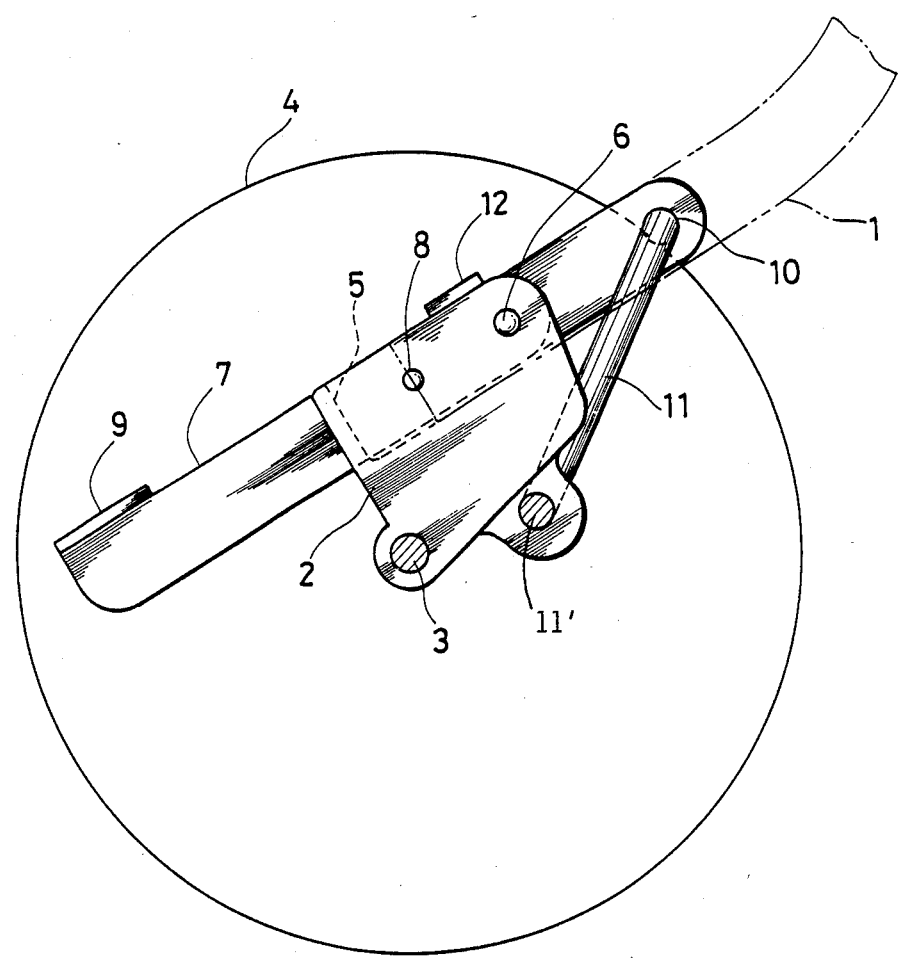
FIG. 2 is a side view showing the state which inhibits the rotation of a rear wheel, said state being obtained from the state of FIG. 1 by operating a lever by foot.

On the other hand, when it is desired to inhibit the rotation of the wheel 4, the operating portion 9 of the lever 7 is stepped on, whereby the lever support member 5 is turned counterclockwise as viewed in FIG. 2 around the axis of the first journal pin 6, and in response thereto the second journal pin 8 and lever 7 are turned counterclockwise around the axis of the first journal pin 6. Further, the brake rod 11 journalling through the through-hole 10 of the lever 7 is turned counterclockwise as viewed in FIG. 2 around its journal connection 11' in the base member 2. Finally, as shown in FIG. 2, the second journal pin 8, the first journal pin 6 and the through-hole 10 forming the fourth journal lie substantially in a chord line of the wheel 4 with the first journal pin 6 disposed between the second journal pin 8 and the fourth journal in the hole 10. In this condition, the brake rod 11 is pressed strongly against the outer peripheral surface of the rear wheel 4, with the result that the rotation of the rear wheel 4 is inhibited. In addition, since the brake rod 11 extends also to be disposed above the outer peripheral surface of the right-hand side rear wheel, the pair of rear wheels are simultaneously inhibited from rotating.

When it is desired to cancel the rotation inhibiting state, the operating portion 9 of the lever 7 is operated by foot for upward displacement. Thereupon, the state shown in FIG. 1 is established again.

In the embodiment described above, the lever support member 5 and lever 7 have been provided in connection with the base member 2 disposed on the left-hand side of the baby carriage; however, as a modification, the lever support member and lever may be provided in connection with the base member disposed on the right-hand side. Further, each of the pair of base members may be provided with said lever support member and lever. In that case, either the right or the left foot can be used to perform the wheel stopping operation.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A wheel stopping device for a baby carriage comprising carriage rear leg means having a lower end, base means (2) rigidly secured to said lower end of said rear leg means, rear wheel means (4) and axle means (3) for rotatably mounting said rear wheel means to said base means, a lever support member (5), first journal means (6) turnably connecting one end of said lever support member to said base means, an operating lever (7), second journal means (8) turnably connecting said operating lever (7) to said lever support member (5) so that said operating lever (7) forms a rocker type lever, one end of said operating lever extending rearwardly for forming an operating portion to be operated by a foot, the other end of said operating lever (7) having a through-hole (10), a brake rod (11), third journal means (11') pivotally connecting one end of said brake rod to said base means said brake rod being bent to extend outwardly along a lateral surface of said rear wheel means, said brake rod having a bent again portion extending through said through-hole (10) of said operating lever (7) to form fourth journal means, said bent again portion being positioned out of contact with an outer peripheral surface of said rear wheel means when said operating lever (7) is in a released position in which said first journal means (6) and said second journal means (8) are located approximately on a common radial line through said axle means (3), said base means (2), said lever support member (5), said operating lever (5), and said brake rod (11) being shaped and positioned relative to one another so that said first, second, and fourth journal means lie substantially in alignment on a chord line of said rear wheel means with said first journal means (6) disposed between said second journal means (8) and said fourth journal means (10) for pressing said bent again portion of said brake rod against the outer peripheral surface of said rear wheel means to thereby inhibit the rotation of said rear wheel means when said operating lever (7) is pushed into a braking position in which said operating lever is self-locked due to said alignment of said first, second, and fourth journal means on said chord line.

* * * * *

UNITED STATES PATENT AND TRADEMARK OFFICE
CERTIFICATE OF CORRECTION

PATENT NO. : 4,714,141

DATED : December 22, 1987

INVENTOR(S) : Kenzou Kassai

It is certified that error appears in the above-identified patent and that said Letters Patent is hereby corrected as shown below:

On the Title Page:

In [57] ABSTRACT, line 9, after "to" insert the following: --reach over both wheel rims and into braking contact with the wheel rims--.

Signed and Sealed this

Third Day of May, 1988

Attest:

DONALD J. QUIGG

Attesting Officer

Commissioner of Patents and Trademarks